US011222385B2

(12) United States Patent
Carter et al.

(10) Patent No.: US 11,222,385 B2
(45) Date of Patent: Jan. 11, 2022

(54) METHOD AND SYSTEM FOR FORECASTING CROP YIELD

(71) Applicant: Athenium LLC, Dover, NH (US)

(72) Inventors: Eric Carter, Westminster, CO (US); Joseph Little, Washington, DC (US)

(*) Notice: Subject to any disclaimer, the term of this patent is extended or adjusted under 35 U.S.C. 154(b) by 599 days.

(21) Appl. No.: 15/876,707

(22) Filed: Jan. 22, 2018

(65) Prior Publication Data

US 2019/0228477 A1  Jul. 25, 2019

(51) Int. Cl.
*G01W 1/10* (2006.01)
*G06Q 50/02* (2012.01)
*G06F 16/29* (2019.01)

(52) U.S. Cl.
CPC .............. *G06Q 50/02* (2013.01); *G01W 1/10* (2013.01); *G06F 16/29* (2019.01)

(58) Field of Classification Search
CPC ............ A63B 21/0087; A63B 21/4025; A63B 21/4035; A63B 21/4047; A63B 21/00069; A63B 1/00
See application file for complete search history.

(56) References Cited

U.S. PATENT DOCUMENTS

| 2016/0247082 | A1* | 8/2016 | Stehling | ............... A01G 22/00 |
| 2017/0213141 | A1* | 7/2017 | Xu | .......................... G06Q 50/02 |
| 2017/0223900 | A1* | 8/2017 | Jagyasi | ..................... G06N 5/04 |
| 2017/0228475 | A1* | 8/2017 | Aldor-Noiman | ..... G06K 9/6247 |

OTHER PUBLICATIONS

Ozaki et al, "Spatiotemporal Modeling of Agricultural Yield Data with an Application to Pricing Crop Insurance Contracts", 2005. (Year: 2005).*

* cited by examiner

*Primary Examiner* — Regis J Betsch
*Assistant Examiner* — Jeremy A Delozier

(57) ABSTRACT

A configurable automated system preprocesses weather and agronomic data to provide a yield forecast model for a target crop in an identified region. The system considers data typically excluded based on biases of a human operator and/or considers data otherwise not considered to be relevant and/or a powerful predictor by a person having ordinary skill in the art. The system builds predictive models through a variety of statistical approaches, selects and validates candidate models, and operates validated models that output in-season forecasts in a production environment.

24 Claims, 7 Drawing Sheets

METHOD AND SYSTEM FOR FORECASTING CROP YIELD

FIELD OF THE INVENTION

The present invention relates to agricultural devices, and more particularly, is related to crop yield estimate systems.

BACKGROUND OF THE INVENTION

Crop yield forecasting has been used in multiple sectors to anticipate production shortfalls and plan for the economic, social, and public health impacts of crop failures. By having advance knowledge of the probable amount of harvested grain, oilseed, or other biomass for a given area, forecast users can better assess downstream impacts and redirect resources accordingly. Use cases range from agribusiness firms that rely on yield forecasts to shape expectations for export flows from major producers; to crop insurers that reference in-season forecasts to anticipate yield losses reported by their policyholders and adjust future risk allocation strategies; to government intelligence and development agencies that use production estimates to identify regions with emerging risks of famine and social instability. Yield forecasts can span a wide range of commodities and growing regions, from commercial-scale row crop production in the US Midwest to low-input staple production in Sub-Saharan Africa and Southeast Asia.

Historically, yield forecasts have fallen under one of two methodologies: physical modeling, where simulation programs extensively parameterize growth conditions with formal equations for photosynthetic efficiency and other relevant physiochemical factors; and empirical modeling, where historical yield time series are paired with historical environmental data to find predictive relationships. Physical modeling can be useful as a counterpart to field research trials, but its accuracy relies heavily on accurate parameterization, which can be difficult to achieve at scale across different growing regions. With unavailable data on factors like cultivars used or fertilizer applied, the necessary parameters are often approximated, to the detriment of forecast accuracy. In contrast, empirical modeling requires a yield time series before any modeling can be initiated; however, once this time series is available, the empirical modeling approach is much more flexible, using any available regional data to explore and identify relationships with yield. With the increased availability of remote sensing data, empirical modeling has become a robust approach for accurately forecasting crop yields.

Unfortunately, manual and semi-automated generation of crop forecasting models is very time-intensive and subject to human bias errors. Accordingly, the process of creating models has been based on assumptions that, while resulting in generally useful models in many cases, result in self-filtering important outlier models that may be useful for both typical (trend) and atypical (anomalous) crop seasons. Therefore, there is a need in the industry to overcome one or more of the abovementioned shortcomings.

SUMMARY OF THE INVENTION

Embodiments of the present invention provide a method and system for forecasting crop yield. Briefly described, the present invention is directed to a configurable automated system that preprocesses weather and agronomic data to provide a yield forecast model for a target crop in an identified region. The system considers data typically excluded based on biases of a human operator and/or considers data otherwise not considered to be relevant and/or a powerful predictor by a person having ordinary skill in the art. The system builds predictive models through a variety of statistical approaches, selects and validates candidate models, and operates validated models that output in-season forecasts in a production environment.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1A:
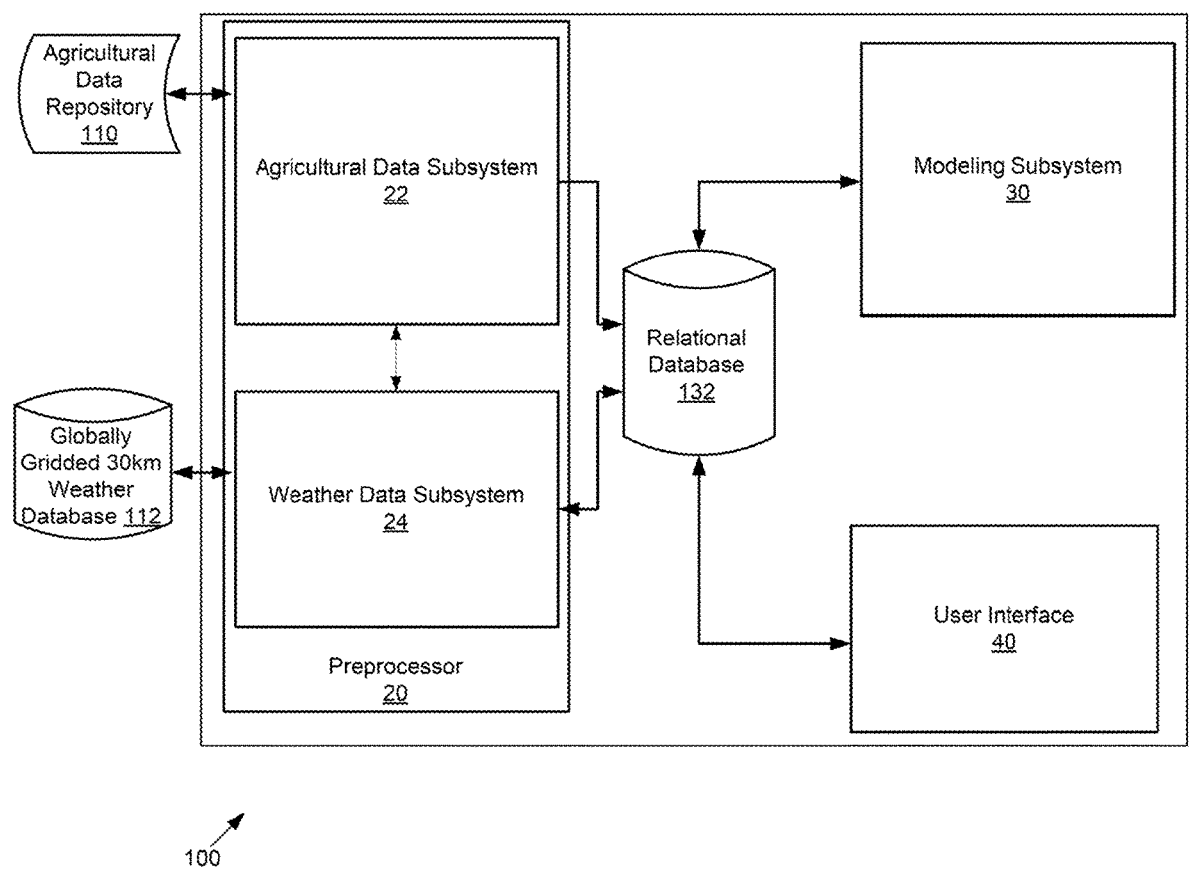
FIG. 1A is a schematic diagram of an exemplary embodiment of a machine-directed crop yield forecasting system and related processes.

The following definitions are useful for interpreting terms applied to features of the embodiments disclosed herein, and are meant only to define elements within the disclosure.

As used within this disclosure, "input collection and transformation" refers to the collection of weather and agricultural data and the subsequent processing to produce a data set for generating crop yield models.

As used within this disclosure, a "crop yield model" refers to a process that predicts a yield of a crop for a growing region before the yield is realized in terms of a set of predictor variables and an optimized statistical framework.

As used within this disclosure, "model build" refers to generation of a crop yield forecast model that may be used to predict future crop yields for identified regions.

As used within this disclosure, "model validation" refers to a process for testing the validity of a crop forecast model over time based on previous crop yield results. The validation may take into effect both the accuracy of the model and the time elapsed between a timestamp of the last entered data and a sufficiently accurate prediction. For example, a model that accurately predicts a crop yield five months in advance of harvest may be more useful than a model that accurately predicts the crop yield one month in advance of harvest.

As used within this disclosure, "in-season model operation" refers to use of models at a time before the crop yields are known.

As used within this disclosure, "agronomic data" refers to reported planted, harvest, and or production amount data/statistics and/or other data indicative of crop progress and/or quality.

Reference will now be made in detail to embodiments of the present invention, examples of which are illustrated in the accompanying drawings. Wherever possible, the same reference numbers are used in the drawings and the description to refer to the same or like parts.

There are several technical considerations for an empirical modeling system to address. These considerations can broadly be captured in the following categories: 1) processing and transformation of historical agricultural and weather data; 2) feature selection; 3) model validation; and 4) operational forecasting. Any empirical model includes a yield time series and a suite of possible variables that may negatively or positively impact yield; a statistical framework that identifies and selects predictor variables (also known as features) for the model; a validation framework that tests the model's "real-world" predictive power by running the model through historical simulations with in-season conditions only becoming known to the model as the simulation progresses; and finally, a data retrieval and job monitoring system that passes updated, in-season conditions to the model and coordinates forecast schedules.

As the number of crops and regions forecasted grows, the empirical modeling framework may be expanded either through hiring additional human forecasters or through an automated system. However, human-directed forecasts may not be able to scale effectively, as the resources used to maintain each of the four major processes involved involve significant, ongoing time and monetary investments.

A machine-directed system provides a streamlined workflow that scales as new crops or growing regions are added. Data processing, feature selection, model validation, and operational forecasting may proceed more quickly and cost-effectively when driven by an automated command hierarchy. As implemented, the machine-directed system may operate at a speed and scale far beyond what is possible with any human-directed effort. Furthermore, the machine-directed systems may be tuned to avoid biases inherent in human-directed efforts that would result in less applicable models.

Data retrieval is commonly semi-automated by programs. Job coordination and monitoring is also often guided by "cron tables" (timing tables) and error logs. However, a machine-driven process that builds and validates predictive models, pairs these processes with data cleansing processes, and has the capability for self-regulation in an operational environment involves a significant advancement over previous forecasting systems. The time and cost savings allows for much more rapid expansion of model coverage. The automated processes also facilitates model replacements with an order and precision unavailable in a human-directed system. Therefore, machine-driven forecasting systems have the power to forecast yields across the globe at national and sub-national resolutions in ways allowing users to identify likely production shortfalls in near real-time at the macro- and micro-scale.

An exemplary embodiment of a machine-directed crop yield forecasting system 100 and related processes is shown by FIG. 1A. The depicted components are explained below.

The representation in the drawings (and any other images contained herein), and the descriptions contained herein should be construed as exemplary only and not to limit the scope of the present invention. At a high level, the system 100 may be viewed as a preprocessor 20 for collecting and processing agricultural data (agricultural data subsystem 22) and weather data (weather data subsystem 24), a relational database 132 for receiving the preprocessed data, a modeling subsystem 30 for generating and validating crop yield models based on the information in the relational database 132, and a user interface 40 providing either manual or automated access to the model output (yield forecasts for the crop and area of interest) stored in the relational database 132. The preprocessor 20 joins the agricultural data subsystem 22 and weather data subsystem 24 by identifying geodesic cells that fall within the geopolitical boundaries of the target model region, then querying the globally gridded 30 km weather database 112 for historical weather data from the identified geodesic cells. Output from both the agricultural data subsystem 22 and the weather data subsystem 24 may be labeled under a codified format and stored in the relational database 132 for downstream modeling purposes. It should be noted that the preprocessor 20 may be continuously collecting and processing updated weather and agricultural data.

Figure 1B:
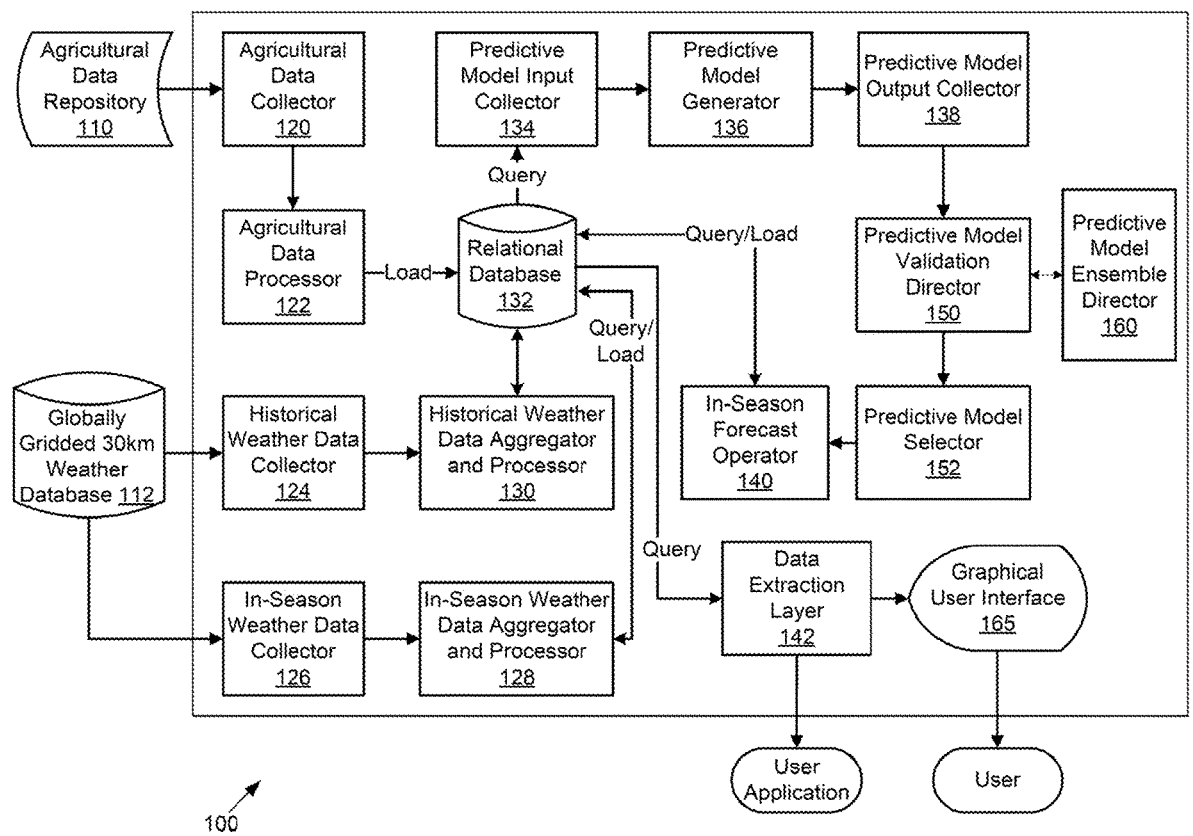
FIG. 1B is a more detailed schematic diagram of the embodiment shown in FIG. 1A.

FIG. 1B is a more detailed schematic drawing of the exemplary embodiment of a machine-directed crop yield forecasting system 100 shown by FIG. 1A. The agricultural data subsystem 22 (FIG. 1A) includes an agricultural data collector 120, and an agricultural data processor 122. The agricultural data collector 120 collects data from an agricultural data repository 110, for example, a governmental or private source, via the Internet or another data communication system. The agricultural data collector 120 may be configured to collect data according to selectable parameters, for example, by growing region and/or data source. Under the first embodiment, the agricultural data collector 120 queries the Application Programming Interface (API) of the United States Department of Agriculture's National Agricultural Statistics Service (USDA-NASS). The query may return fields such as planted acreage, harvested acreage, and production in bushels, depending on the query parameters, for example, growing regions, years, and crops of interest, among other fields.

The first embodiment provides parallel functionality for automated queries and human-directed queries not available in previous methods/systems. Without human direction, the agricultural data collector 120 automatically retrieves agricultural statistics as they become available for regions and crops that the system 100 recognizes as forecast targets. The forecast targets may be, for example, crop/region pairings which may be pre-identified based on several factors, for example, point in time, and/or command line calls. For the first embodiment, the agricultural data collector 120 retrieves data for the most recent growing season that are not currently stored by the system 100 (i.e., 2016 spring-planted crop yields after USDA-NASS releases final data the following winter). However, with human direction, the agricultural data collector 120 may retrieve agricultural statistics for regions and crops that the system 100 does not yet forecast; this direction may be prompted by a command line call that accepts new region, crop, and years of interest as arguments. For the first embodiment, the agricultural data collector 120 may retrieve a historical time series (i.e., all production and acreage data for the target region and crop from 1980-present). In addition, using standard machine-learning techniques, the system 100 may be configured to evaluate human-instigated data calls and develop additional forecast targets for future retrieval.

Figure 3:
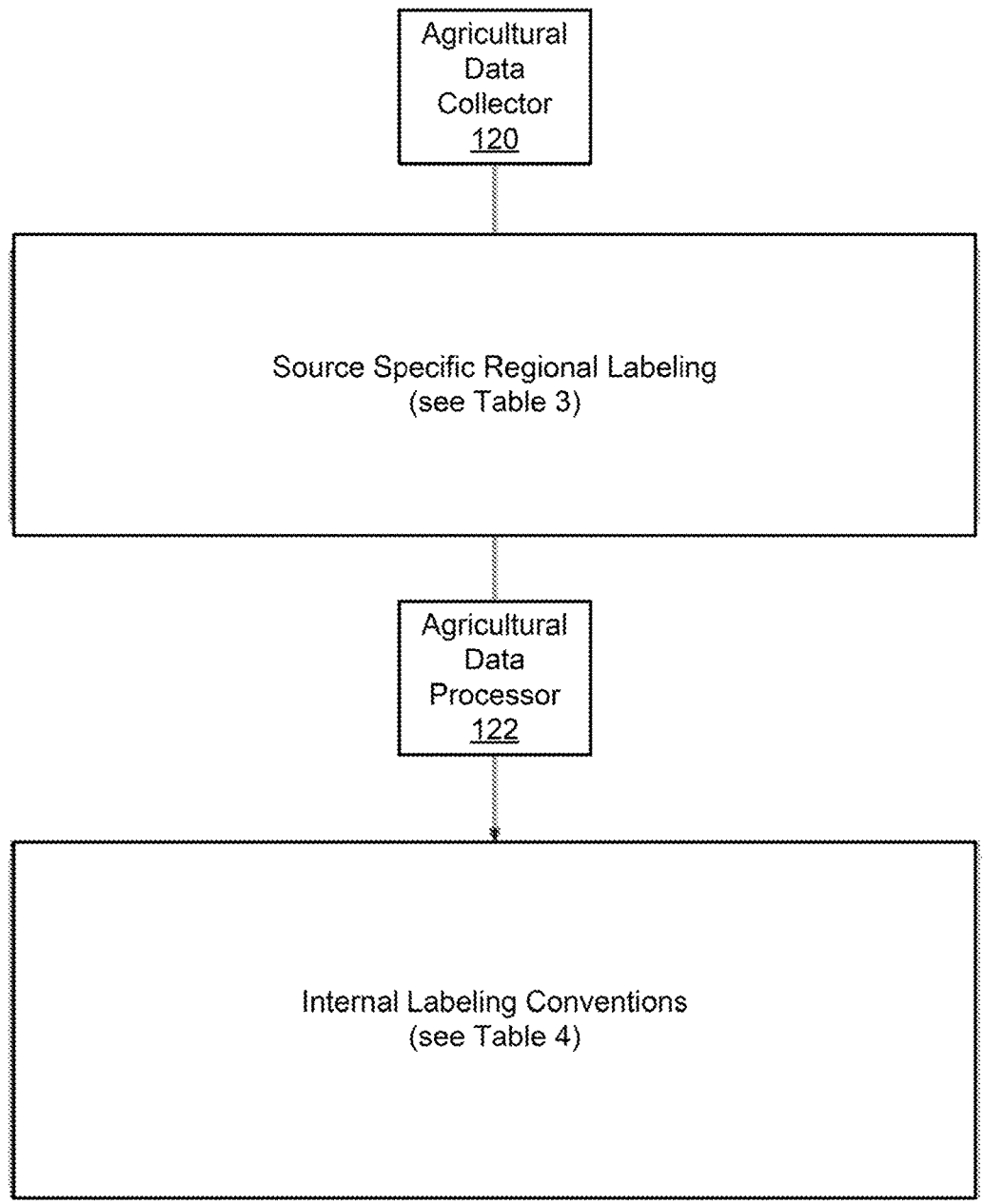
FIG. 3 is a schematic diagram of an exemplary embodiment of the agricultural data collection and processing sub-component of FIG. 1B.

Once the target data are collected by the agricultural data collector 120, the agricultural data processor 122, illustrated in FIG. 3, conducts multiple data processing steps to prepare the ingested data for use as predictive model inputs to be stored in the relational database 132.

First, the agricultural data processor 122 converts source specific regional labeling, shown in table 3, to internal labeling conventions, as shown in Table 4.

distinct entities. The Agricultural Data Processor 122 converts relevant source-specific labels to comply with codified internal standards of the system 100. Alternative embodiments may use different labeling standards.

After the label processing, the agricultural data processor 122 then produces a yield time series from production and acreage data for each region/crop pair queried by the agricultural data collector 120. In the exemplary embodiment of USDA-NASS data, the processing step returns yield per planted acre, yield per harvested acre, and, in some cases,

TABLE 3

Source Specific Regional Labeling

CV(%),Value,agg_level_desc,asd_code,asd_desc,begin_code,class_desc,commodity_desc,congr_district_code,
country_code,country_name,county_ansi,county_code,county_name,domain_desc,
domaincat_desc,end_code,freq_desc,group_desc,load_time,location_desc,prodn_practice_desc,reference_period_desc,
region_desc,sector_desc,short_desc,source_desc,state_alpha,state_ansi,state_fips_code,
state_name,statisticcat_desc,unit_desc,util_practice_desc,watershed_code,watershed_desc,
week_ending,year,zip_5
"46,776,000",COUNTY,20,NORTHEAST,0,ALL CLASSES,CORN,,9000,UNITED
STATES,37,37,DE KALB TOTAL,NOT SPECIFIED,0,ANNUAL,FIELD CROPS,2/23/2017
15:00,"ILLINOIS, NORTHEAST, DE KALB",ALL PRODUCTION
PRACTICES,YEAR,,CROPS,"CORN, GRAIN - PRODUCTION, MEASURED IN
BU", SURVEY,IL,17,17,ILLINOIS,PRODUCTION,BU,GRAIN,0,,,2016,
"40,421,000",COUNTY,20,NORTHEAST,0,ALL CLASSES,CORN,,9000,UNITED
STATES,37,37,DE KALB,TOTAL,NOT SPECIFIED,0,ANNUAL,FIELD CROPS,12/2/2016
9:27,"ILLINOIS, NORTHEAST, DE KALB",ALL PRODUCTION
PRACTICES,YEAR,,CROPS,"CORN, GRAIN - PRODUCTION, MEASURED IN
BU", SURVEY,IL,17,17,ILLINOIS,PRODUCTION,BU, GRAIN,0,,,2015,,
"42,704,000",COUNTY,20,NORTHEAST,0,ALL CLASSES,CORN,,9000,UNITED
STATES,37,37,DE KALB,TOTAL,NOT SPECIFIED,0,ANNUAL,FIELD CROPS,2/19/2015
15:38,"ILLINOIS, NORTHEAST, DE KALB",ALL PRODUCTION
PRACTICES,YEAR,,CROPS,"CORN, GRAIN - PRODUCTION, MEASURED IN
BU", SURVEY,IL,17,17,ILLINOIS,PRODUCTION,BU,GRAIN,0,,,2014,

TABLE 4

Internal Labeling Conventions region_0,region_1,region_2,region_3,Crop,Date1,wgt_type,1979,1980,1981,1982,1983,1984,1985,
1986,1987,1988,1989,1990,1991,1992,1993,1994,1995,1996,1997,1998,1999,2000,2001,2002,
2003,2004,2005,2006,2007,2008,2009,2010,2011,2012,2013,2014,2015,2016,2017
US,IL,20,DeKalb,corn,11/1/1979,3,0,125.4183007,133.6694107,138.6404887,100.0643196,124.6464333,
146.0834443,134.5310097,138.1464104,92.80846561,138.3873205,130.4159544,116.4705314,
135.8168182,117.0707071,167.0047619,124.0692308,135.3838863,139.0105263,169.3673469,
152.6153846,154.8482234,142.65,140.5549223,167.8092784,178.2524272,144.3179724,
178.8554502,195.8084677,188.1888412,157.8223684,177.2838428,180.8163265,154.2226981,192.2166667,
191.9280899,181.6674157,214.0778032,
US,IL,70,Douglas,corn,11/1/1979,3,0,81.24130274,129.989418,136.376304,82.58887677,115.7564767,
135.2888222,153.6516184,162.0301263,88.18716094,131.1820491,134.9737058,101.3252033,
162.6088,141.4663866,160.7484375,116.0084746,130.0075758,129.0330579,122.787931,
136.8595041,143.7732283,169.0245902,132.8661538,176.1365854,180.2075758,151.8832117,
166.4955224,182.6596026,162.9171429,178.6108696,169.9836066,151.7890625,98.18548387,185.2427984,
221.9411765,207.8205128,207.1949153,
US,IL,20,DuPage,corn,11/1/1979,3,0,103.3277778,122.6225166,128.2689655,82.19117647,92.68,
112.67,111.3710692,126.902439,99.16666667,128.8473282,117.8666667,86.24,112.9428571,
115.9714286,141.375,103.5,113.6571429,125.3142857,153.7714286,130.34,120.54,127.8333333,
89.7,145,155.6333333,101.5,147.25,161.4333333,156.3595301,129.5333333,143.0944147,146.6292824,
109.8694298,154.6895218,163.0034763,150.8855421,156.1928467, Without these conversions, programmatic infrastructure may be unable to process these collected data in downstream processes. In the exemplary embodiment of data collected from the USDA-NASS repository, USDA-NASS uses specific formatting for regional information, capitalizing all characters in a regional name and introducing unorthodox spacing in a manner that is inconsistent with other common formats (i.e., "DE KALB" instead of the proper "DeKalb"). Although a human can readily identify discrepancies in labels and intuit that the labels refer to the same entity, a naïve computer program may generally treat these labels as yield per net planted acre, where additional calculations account for artefacts in USDA-NASS acreage collection methods.

The above yield type conversion step is desirable to successfully capture historical relationships between weather and yield. The type of yield time series used as an input to the modeling subsystem 30 (described below) may impact the strength and type of relationships captured with environmental data. The most robust type of yield input is yield per planted acre, which captures the impact of weather throughout the growing season. Generally, harvested acreage tends to be smaller than planted acreage; extreme weather prompts farmers to abandon acreage when the likely yield does not justify the time and resources required to harvest the area. Yield per planted acreage may capture losses from abandoned acreage. Conversely, yield per harvested acreage may not; in extreme cases, yield per planted acreage may serve as an inflated estimate of yield that masks the catastrophic impacts of adverse weather. As a queryable field, the USDA-NASS repository reports yield only in yield per harvested acre, so any modeling efforts incorporating these data may encounter a dampened signal when exploring statistical relationships.

Depending on the source repository and target region for modeling, yield time series may be in imperial or metric units. While downstream modeling may be based in the more common unit for the modeled crop and region, the data extraction layer 142 has the capability to convert between units for user-facing applications based on user preference.

With the yield data calculated, the agricultural data processor 122 then accounts for missing yield observations in the collected data. The collected data may be, for example in dataframe format to leverage preprocessing capabilities of Python. The agricultural data processor 122 searches for missing yield observations for the date range queried and replaces missing data points with estimated yields. These estimations may take a variety of forms. In the first embodiment, estimated yields may be determined by comparing historical yield ratios of the geographic level in question with the larger parent geographic level. For example, a county may yield 5% more (on average over the past 30 years) than its parent agricultural district, which typically includes six to nine counties. In instances where the county is missing a recorded yield for a given year, the agricultural data processor 122 may reference the yield for the parent agricultural district in that year and uses the historical county-district ratio to approximate what the yield for the county had likely been for that growing season. In rare cases the agricultural data processor 122 may reference the yield for the next available geographic level and use the historical ratio of the county with that level to approximate likely yield.

Alternative embodiments may estimate yields using other techniques. For example, in one alternative embodiment, yield at a particular geographic location may be estimated by first finding a geographic area situated in a similar agroecological zone, but with no shared geopolitical grouping, for which a strong correlation exists between the historical yields of the two areas. The missing yield data may then be supplied from the strongly correlated geographic location.

For each method of gap filling, the transformed, gap-filled yield time series may be stored in the relational database 132.

The weather data subsystem 24 (FIG. 1A) includes a historical data collector 124, a historical weather data aggregator and processor 130, an in-season weather data collector 126, and an in-season weather data aggregator and processor 128. While the first embodiment described herein segments the functionality of the weather data subsystem 24 into four subcomponents 124, 126, 128, 130, in alternative embodiments this functionality may be differently partitioned, or not partitioned at all. In a parallel process to the agricultural data collection and processing steps described above, the historical weather data collector 124, shown by FIG. 2, collects historical weather data whenever a query for a new region/crop target passes through the agricultural data collector 120. Table 2 shows an example of historical weather data in comma delimited format:

TABLE 1

Example of Historical Weather Data

Year,Month,Day,State,County,avg_Rh_PCT,max_Rh_PCT,min_Rh_PCT,tot_Rh_PCT,stdev_Rh_PCT,
avg_Tsfc_C,max_Tsfc_C,min_Tsfc_C,tot_Tsfc_C,stdev_Tsfc_C,avg_Tdew_C,max_Tdew_C,
min_Tdew_C,tot_Tdew_C,stdev_Tdew_C,avg_Spd_KPH,max_Spd_KPH,min_Spd_KPH,tot_Spd_KPH,
stdev_Spd_KPH,avg_CldCov_PCT,max_CldCov_PCT,min_CldCov_PCT,tot_Cld
Cov_PCT,stdev_CldCov_PCT,avg_PcpPrevHr_CM,max_PcpPrevHr_CM,min_PcpPrevHr_CM,
tot_PcpPrevHr_CM,stdev_PcpPrevHr_CM,avg_Tsoil_0-10_C,max_Tsoil_0-10_C,min_Tsoil_0-
10_C,tot_Tsoil_0-10 C,stdev_Tsoil_0-10_C,avg_Tsoil_10-40_C,max_Tsoil_10-
40_C,min_Tsoil_10-40_C,tot_Tsoil_10-40_C,stdev_Tsoil_10-40_C,avg_Tsoil_40-
100_C,max_Tsoil_40-100_C,min_Tsoil_40-100_C,tot_Tsoil_40-100_C, stdev_Tsoil_40-
100_C,avg_Qsoil_0-10_PCT,max_Qsoil_0-10_PCT,min_Qsoil_0-10_PCT,tot_Qsoil_0-
10_PCT,stdev_Qsoil_0-10_PCT,avg_Qsoil_10-40_PCT,max_Qsoil_10-40_PCT,min_Qsoil_10-
40_PCT,tot_Qsoil_10-40_PCT,stdev_Qsoil_10-40_PCT,avg Qsoil_40-
100_PCT,max_Qsoil_40-100_PCT,min_Qsoil_40-100_PCT,tot_Qsoil_40-
100_PCT,stdev_Qsoil_40-100_PCT,avg_Qsoil_100-200_PCT,max_Qsoil_100-
200_PCT,min_Qsoil_100-200_PCT,tot_Qsoil_100-200_PCT,stdev_Qsoil_100-
200_PCT,avg_Qsoil_0-200_KGsqM,max_Qsoil_0-200_KGsqM,min_Qsoil_0-
200_KGsqM,tot_Qsoil_0-200_KGsqM,stdev_Qsoil_0-
200_KGsqM,avg_RunOffPrevHr_CM,max_RunOffPrevHr_CM,min_RunOffPrevHr_CM,tot_RunOffPrevHr_CM,
stdev_RunOffPrevHr_CM,avg_PotEvap_MMpHr,max_PotEvap_MMpHr,min_PotEvap_MMpHr,
tot_PotEvap_MMpHr,stdev_PotEvap_MMpHr,avg_Albedo_PCT,max_Albedo_PCT,
min_Albedo_PCT,tot_Albedo_PCT,stdev_Albedo_PCT,avg_Veg_PCT,max_Veg_PCT,
min_Veg_PCT,tot_Veg_PCT,stdev_Veg_PCT,avg_SnowDepth_M,max_SnowDepth_M,min_SnowDepth_M,
tot_SnowDepth_M,stdev_SnowDepth_M,avg_dn_sol_wsqm,max_dn_sol_wsqm,
min_dn_sol_wsqm,tot_dn_sol_wsqm,stdev_dn_sol_wsqm
1979,01,01,IL,DeKalb,90.5,94.8,82.5,4160.0,3.92,−11.84,−6.28,−19.67,−545.0,3.4,−14.0,−8.07,−22.72,−644.0,
3.97,27.72,31.1,24.12,1275.0,1.86,100.0,100.0,100.0,4600.0,0.0,0.0171,0.0369,0.0,0.788,0.0098,
−3.86,−2.64,−6.12,−178.0,
0.937,0.42,0.83,0.05,19.0,0.347,2.69,2.99,2.36,124.0,0.281,46.2,46.3,46.1,2125.0,0.1,39.0,
39.4,38.6,1794.0,0.4,31.6,32.2,31.0,1456.0,0.555,30.7,30.8,30.5,1410.0,0.1082,660.0,665.0,654.0,
30300.0,5.5,2.2e−05,8e−05,0.0,0.001,1.9e−05,
57.0,98.0,15.0,2600.0,19.0,26.32,100.0,0.0,1211.0,29.55,2.1,2.2,2.0,100.0,0.06,0.1527,0.43,0.06,
7.02,0.10593,44.0,210.0,0.0,2010.0,67.0
1979,01,02,IL,DeKalb,84.9,92.1,71.8,4070.0,6.36,−22.64,−18.83,−26.4,−1087.0,1.72,−27.02,−23.11,
−30.17,−1297.0,
1.36,22.53,27.0,16.97,1081.0,2.32,59.7,100.0,7.5,2870.0,23.3,0.0002,0.001,0.0,0.009,0.0003, TABLE 1-continued Example of Historical Weather Data −6.68,−3.19,−10.37,−321.0,2.855,0.46,0.93,−0.5,
22.0,0.421,2.61,2.92,2.28,125.0,0.288,46.2,46.3,46.1,2218.0,0.1,39.0,39.4,38.6,1872.0,0.4,31.6,
32.2,31.0,1517.0,0.596,30.7,30.8,30.5,1472.0,0.0817,660.0,665.0,654.0,31700.0,5.5,1.9e−05,
9e−05,0.0,0.0009,1.7e−05,
28.0,78.0,3.0,1300.0,20.0,27.41,100.0,0.0,1316.0,32.07,2.0,2.1,2.0,100.0,0.044,0.3278,0.578,
0.183,15.73,0.13892,101.0,457.0,0.0,4850.0,158.0
1979,01,03,IL,DeKalb,87.7,93.8,76.0,4210.0,5.13,−18.7,−13.82,−24.62,−898.0,3.5,−22.17,−16.59,−28.28,−1064.0,
3.9,22.97,27.3,17.63,1102.0,2.63,78.0,100.0,36.4,3750.0,20.1,0.0012,0.0056,0.0,0.059,0.0017,
−7.29,−4.46,−11.07,−350.0,2.686,−0.31,0.9,−2.33,−15.0,
1.087,2.54,2.86,2.19,122.0,0.303,46.2,46.3,46.1,2218.0,0.1,39.0,39.4,38.6,1872.0,0.4,31.6,32.2,
31.0,1517.0,0.6,30.7,30.8,30.6,1472.0,0.0781,660.0,665.0,654.0,31700.0,5.5,1.3e−05,9e−05,
0.0,0.0006,1.6e−05,
28.0,95.0,3.0,1300.0,22.0,27.73,100.0,0.0,1331.0,32.46,1.9,2.0,1.9,90.0,0.049,0.3809,0.578,0.151,
18.28,0.16685,100.0,450.0,0.0,4800.0,157.0
1979,01,04,IL,DeKalb,85.7,93.6,70.6,4110.0,6.52,−18.0,−13.83,−21.31,−864.0,1.95,−21.71,−16.68,
−24.55,−1042.0,
2.16,19.23,27.4,10.63,923.0,5.19,90.2,100.0,32.1,4330.0,19.3,0.0009,0.0065,0.0,0.041,0.0015,
−7.26,−4.87,−10.08,−349.0,2.157,−1.35,0.37,−3.57,−65.0,
1.64,2.49,2.81,2.17,120.0,0.307,46.2,46.3,46.1,2218.0,0.1,39.0,39.4,38.6,1873.0,0.383,31.6,
32.2,31.0,1516.0,0.582,30.7,30.8,30.6,1473.0,0.0991,660.0,665.0,654.0,31700.0,5.5,2.1e−05,8e−05,
0.0,0.001,2.4e−05,
31.0,87.0,3.0,1500.0,22.0,26.98,100.0,0.0,1295.0,31.73,1.9,1.9,1.8,90.0,0.042,0.2677,0.387,0.15,
12.85,0.11653,100.0,463.0,0.0,4780.0,159.0

The historical weather data may be hosted local or remotely, in which case the historical weather data collector 124 may, for example via an electronic connection, query and retrieve the remotely hosted data. In the exemplary embodiment, the historical weather data collector 124 may, for example, utilize a weather database containing rationalized, hourly weather data gridded globally at a 30-kilometer (km) resolution dating back to 1979. In alternative embodiments, other weather gridding systems having different grid granularities may be used. When a human user initiates a query for a region the system 100 does not recognize, the historical weather data collector 124 may find all grid IDs associated with the region of interest, query the weather database for historical weather data associated with those grid IDs, and return a time series of daily values for a comprehensive suite of weather variables for each grid ID, which may include, for example, surface temperature, precipitation, soil moisture, evapotranspiration, downward solar radiation, and numerous other weather phenomena. These daily values may be stored in a comma-separated format (CSV) or another dataframe structure. The daily values may also be stored for later display through a Graphical User Interface 165 (GUI) to end users connected locally or remotely to the System.

Figure 2:
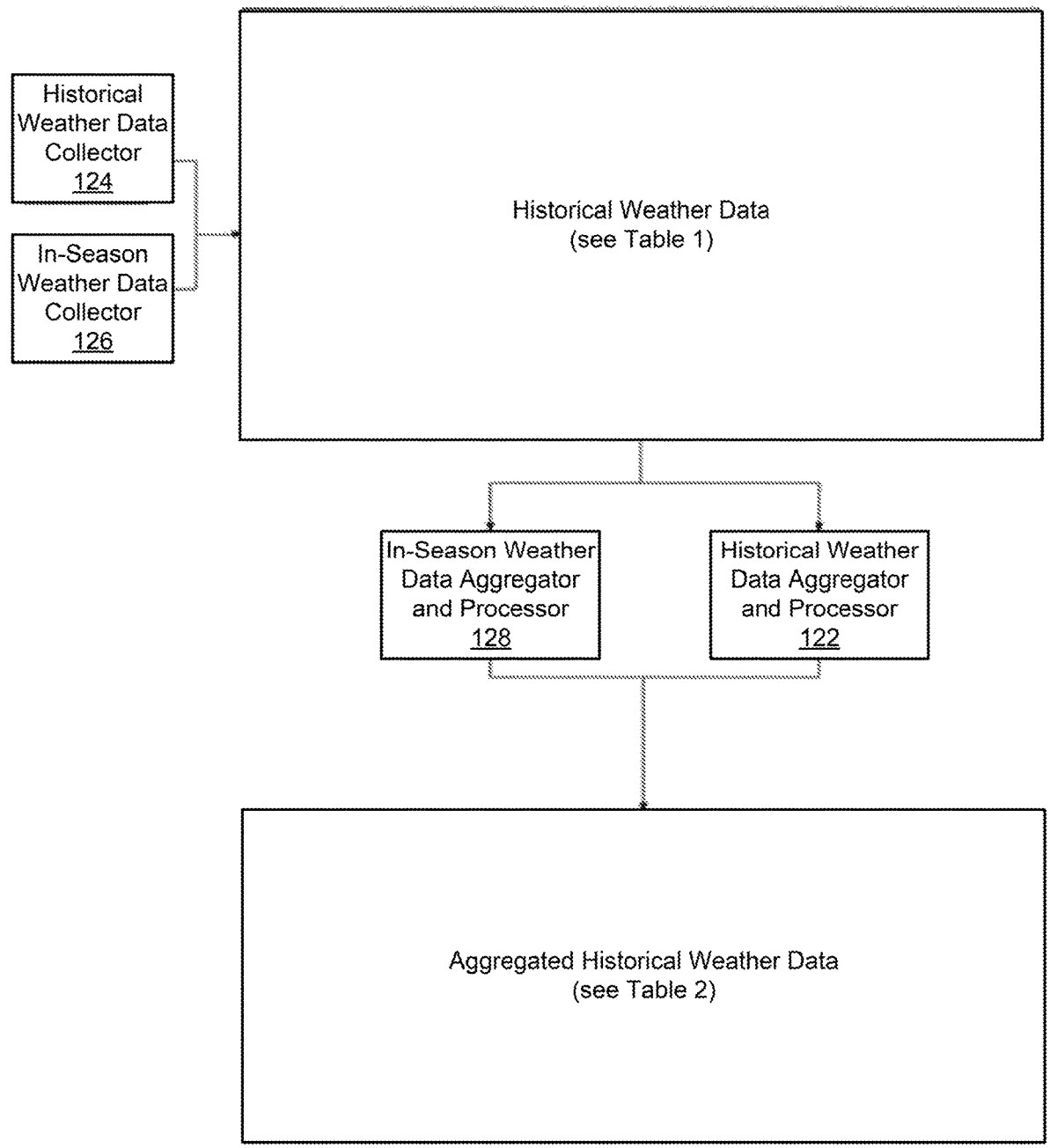
FIG. 2 is a schematic diagram of an exemplary embodiment of the weather data collection and processing sub-component of FIG. 1B.

After the historical weather data collector 124 has returned daily values for the desired historical range, these values enter an aggregation and processing layer, illustrated in FIG. 2. This layer captures how weather impacts crop yields.

Aggregation can take a variety of forms. In one embodiment, the system 100 utilizes aggregation over custom period of times, corresponding to critical periods for crop health and thus yield. Compared to standard monthly aggregation, weather variables aggregated in custom periods may more accurately correspond with critical stages of crop growth. As an illustration, extreme heat over a 14-day period in mid-July may correspond with the peak tasseling period for corn, identifying with more specificity the period that the crop is most susceptible to severe yield losses. If the month of July started with cooler-than-normal temperatures, a monthly average would be oversmoothed and likely not have the same predictive power as the 14-day period.

In one exemplary embodiment, custom periods are created using a random number generator, with the historical weather data aggregator and processor 130 iterating through different start points and period lengths. Each start point is an integer 1 through 365, corresponding to a given day in a year-long window that encompasses the growing season. Each period length is an integer corresponding to the number of days in the aggregation window. As an illustration, the average of maximum daily temperatures over a 30-day interval that begins 90 days from the growing season reference start may be labeled max_tsfc_st90_len30. The growing season reference start is unique to each crop and growing region modeled. The system 100 determines the growing season reference start by numerous attributes, including the hemisphere in which the growing region is located and the typical days to maturity of the crop grown. An example of a subset of headers for aggregated historical weather data in comma-delimited form is shown in Table 2:

TABLE 2

Aggregated Historical Weather Data Headers absorption_1,absorption_10,absorption_10_SqDif_6.9,absorption_11,absorption_11_SqDif_19.96,
absorption_12,absorption_12_SqDif_7.48,absorption_1_SqDif_12.7,absorption_2,absorption_2_SqDif_8.21,
absorption_3,absorption_3_SqDif_8.58,absorption_4,absorption_4_SqDif_11.23,absorption_5,
absorption_5_SqDif_12.07,absorption_6,absorption_6_SqDif_12.61,absorption_7,absorption_7_SqDif_10.41,
absorption_8,absorption_8_SqDif_10.25,absorption_9,absorption_9_SqDif_1.62,
absorption_st140_len20,absorption_st140_len20_SqDif_10.65,avg_Albedo_PCT_1,avg_Albedo_PCT_10,
avg_Albedo_PCT_10_SqDif_8.73,avg_Albedo_PCT_11,avg_Albedo_PCT_11_SqDif_11.02,
avg_Albedo_PCT_12,avg_Albedo_PCT_12_SqDif_25.6,avg_Albedo_PCT_1_SqDif_23.07,
avg_Albedo_PCT_2,avg_Albedo_PCT_2_SqDif_15.77,avg_Albedo_PCT_3,avg_Albedo_PCT_3_SqDif_14.6, TABLE 2-continued Aggregated Historical Weather Data Headers avg_Albedo_PCT_4,avg_Albedo_PCT_4_SqDif_18.59,avg_Albedo_PCT_5,
avg_Albedo_PCT_5_SqDif_18.04,avg_Albedo_PCT_6,avg_Albedo_PCT_6_SqDif_18.4,
avg_Albedo_PCT_7,avg_Albedo_PCT_7_SqDif_18.8,avg_Albedo_PCT_8,avg_Albedo_PCT_8_SqDif_17.72,
avg_Albedo_PCT_9,avg_Albedo_PCT_9_SqDif_14.48,avg_Albedo_PCT_st0_len20,
avg_Albedo_PCT_st0_len20_SqDif_15.14,avg_CldCov_PCT_1,avg_CldCov_PCT_10,avg_CldCov_PCT_10_SqDif_46.02,
avg_CldCov_PCT_11,avg_CldCov_PCT_11_SqDif_54.23,avg_CldCov_PCT_12,
avg_CldCov_PCT_12_SqDif_64.05,avg_CldCov_PCT_1_SqDif_73.09,avg_CldCov_PCT_2,
avg_CldCov_PCT_2_SqDif_94.01,avg_CldCov_PCT_3,avg_CldCov_PCT_3_SqDif_60.86,
avg_CldCov_PCT_4,avg_CldCov_PCT_4_SqDif_63.48,avg_CldCov_PCT_5,avg_CldCov_PCT_5_SqDif_56.83,
avg_CldCov_PCT_6,avg_CldCov_PCT_6_SqDif_52.55,avg_CldCov_PCT_7,
avg_CldCov_PCT_7_SqDif_45.19,avg_CldCov_PCT_8,avg_CldCov_PCT_8_SqDif_33.9,
avg_CldCov_PCT_9,avg_CldCov_PCT_9_SqDif_45.82,avg_CldCov_PCT_st140_len55,
avg_CldCov_PCT_st140_len55_SqDif_48.04,avg_PcpPrevHr_CM_1,avg_PcpPrevHr_CM_10,
avg_PcpPrevHr_CM_10_SqDif_7.32,avg_PcpPrevHr_CM_11,avg_PcpPrevHr_CM_11_SqDif_20.98,
avg_PcpPrevHr_CM_12,avg_PcpPrevHr_CM_12_SqDif_7.69,avg_PcpPrevHr_CM_1_SqDif_12.45,
avg_PcpPrevHr_CM_2,avg_PcpPrevHr_CM_2_SqDif_9.39,avg_PcpPrevHr_CM_3,
avg_PcpPrevHr_CM_3_SqDif_9.24,avg_PcpPrevHr_CM_4,avg_PcpPrevHr_CM_4_SqDif_16.26,
avg_PcpPrevHr_CM_5,avg_PcpPrevHr_CM_5_SqDif_12.86,avg_PcpPrevHr_CM_6,avg_Pcp
PrevHr_CM_6_SqDif_14.94, avg_PcpPrevHr_CM_7, avg_PcpPrevHr_CM_7_SqDif_12.33, avg_PcpPrevHr_CM_8,
avg_PcpPrevHr_CM_8_SqDif_11.73,avg_PcpPrevHr_CM_9,avg_PcpPrevHr_CM_9_SqDif_18.86,
avg_PcpPrevHr_CM_st150_len20,avg_PcpPrevHr_CM_st150_len20_SqDif_13.79,
avg_PotEvap_MMpHr_1,avg_PotEvap_MMpHr_10,avg_PotEvap_MMpHr_10_SqDif_295.11,
avg_PotEvap_MMpHr_11,avg_PotEvap_MMpHr_11_SqDif_98.7,avg_PotEvap_MMpHr_12,
avg_PotEvap_MMpHr_12_SqDif_72.68,avg_PotEvap_MMpHr_1_SqDif_47.84,avg_PotEvap_MMpHr_2,
avg_PotEvap_MMpHr_2_SqDif_97.18,avg_PotEvap_MMpHr_3,avg_PotEvap_MMpHr_3_SqDif_194.38,
avg_PotEvap_MMpHr_4,avg_PotEvap_MMpHr_4_SqDiff_295.33,avg_PotEvap_MMpHr_5,
avg_PotEvap_MMpHr_5_SqDif_470.77,avg_PotEvap_MMpHr_6,avg_PotEvap_MMpHr_6_SqDif_550.29,
avg_PotEvap_MMpHr_7,avg_PotEvap_MMpHr_7_SqDif_572.95,
avg_PotEvap_MMpHr_8, avg_PotEvap_MMpHr_8_SqDif_559.33,avg_PotEvap_MMpHr_9,
avg_PotEvap_MMpHr_9_SqDif_475.29,avg_PotEvap_MMpHr_st10_len30,avg_PotEvap_MMpHr_st10_len30_SqDif_175.43,
avg_Qsoil_0-10_PCT_1,avg_Qsoil_0-
10_PCT_10,avg_Qsoil_0-10_PCT10_SqDif_23.01,avg_Qsoil_0-10_PCT_11,avg_Qsoil_0-
10_PCT_11_SqDif_16.79,avg_Qsoil_0-10_PCT_12,avg_Qsoil_0-
10_PCT12_SqDif_35.66,avg_Qsoil_0-10_PCT_1_SqDif_25.79,avg_Qsoil_0-
10_PCT_2,avg_Qsoil_0-10_PCT_2_SqDif_38.04,avg_Qsoil_0-10_PCT_3,avg_Qsoil_0-
10_PCT_3_SqDif_32.68,avg_Qsoil_0-10_PCT_4,avg_Qsoil_0-
10_PCT_4_SqDif_33.48,avg_Qsoil_0-10_PCT_5,avg_Qsoil_0-
10_PCT_5_SqDif_25.12,avg_Qsoil_0-10_PCT_6,avg_Qsoil_0-
10_PCT_6_SqDif_28.07,avg_Qsoil_0-10_PCT_7,avg_Qsoil_0-
10_PCT_7_SqDif_25.03,avg_Qsoil_0-10_PCT_8,avg_Qsoil_0-
10_PCT_8_SqDif_22.3,avg_Qsoil_0-10_PCT_9,avg_Qsoil_0-
10_PCT_9_SqDif_23.59,avg_Qsoil_0-10_PCT_st155_len35,avg_Qsoil_0-
10_PCT_st155_len35_SqDif_24.06,avg_Qsoil_0-200_KGsqM_1,avg_Qsoil_0-
200_KGsqM_10,avg_Qsoil_0-200_KGsqM_10_SqDif_435.26,avg_Qsoil_0-
200_KGsqM_11,avg_Qsoil_0-200_KGsqM_11_SqDif_553.52,avg_Qsoil_0-
200_KGsqM_12,avg_Qsoil_0-200_KGsqM_12_SqDif_651.53,avg_Qsoil_0-
200_KGsqM_1_SqDif_722.45,avg_Qsoil_0-200_KGsqM_2,avg_Qsoil_0-
200_KGsqM_2_SqDif_496.11,avg_Qsoil_0-200_KGsqM_3,avg_Qsoil_0-
200_KGsqM_3_SqDif_727.47,avg_Qsoil_0-200_KGsqM_4,avg_Qsoil_0-
200_KGsqM_4_SqDif_778.07,avg_Qsoil_0-200_KGsqM_5,avg_Qsoil_0-
200_KGsqM_5_SqDif_670.99,avg_Qsoil_0-200_KGsqM_6,avg_Qsoil_0-
200_KGsqM_6_SqDif_719.1,avg_Qsoil_0-200_KGsqM_7,avg_Qsoil_0-
200_KGsqM_7 SqDif_552.6,avg_Qsoil_0-200_KGsqM_8,avg_Qsoil_0-
200_KGsqM_8_SqDif_501.81,avg_Qsoil_0-200_KGsqM_9,avg_Qsoil_0-
200_KGsqM_9_SqDif_497.52,avg_Qsoil_0-200_KGsqM_st0_len20,avg_Qsoil_0-
200_KGsqM_st0_len20_SqDif_495.15,avg_Qsoil_10-40_PCT_1,avg_Qsoil_10-
40_PCT_10,avg_Qsoil_10-40_PCT10_SqDif_22.77,avg_Qsoil_10-40_PCT_11,avg_Qsoil_10-
40_PCT_11_SqDif_30.61,avg_Qsoil_10-40_PCT_12,avg_Qsoil_10-
40_PCT_12_SqDif_21.86,avg_Qsoil_10-40_PCT_1_SqDif_46.06,avg_Qsoil_10-
40_PCT_2,avg_Qsoil_10-40_PCT_2_SqDif_31.16,avg_Qsoil_10-40_PCT_3,avg_Qsoil_10-
40_PCT_3_SqDif_32.49,avg_Qsoil_10-40_PCT_4,avg_Qsoil_10-
40_PCT_4_SqDif_35.43,avg_Qsoil_10-40_PCT_5,avg_Qsoil_10-
40_PCT_5_SqDif_36.19,avg_Qsoil_10-40_PCT_6,avg_Qsoil_10-
40_PCT_6_SqDif_28.12,avg_Qsoil_10-40_PCT_7,avg_Qsoil_10-
40_PCT_7_SqDif_24.22,avg_Qsoil_10-40_PCT_8,avg_Qsoil_10-
40_PCT_8_SqDif_20.11,avg_Qsoil_10-40_PCT_9,avg_Qsoil_10-
40_PCT_9_SqDif_21.42,avg_Qsoil_10-40_PCT_st0_len20,avg_Qsoil_10-
40_PCT_st0_len20_SqDif_27.54,avg_Qsoil_100-200_PCT_1,avg_Qsoil_100-
200_PCT_10,avg_Qsoil_100-200_PCT_10_SqDif_31.58,avg_Qsoil_100-
200_PCT_11,avg_Qsoil_100-200_PCT_11_SqDif_30.21,avg_Qsoil_100-
200_PCT_12,avg_Qsoil_100-200_PCT_12_SqDif_31.08,avg_Qsoil_100-
200_PCT_1_SqDif_30.37,avg_Qsoil_100-200_PCT_2,avg_Qsoil_100-
200_PCT_2_SqDif_30.32,avg_Qsoil_100-200_PCT_3,avg_Qsoil_100-
200_PCT_3_SqDif_31.22,avg_Qsoil_100-200_PCT_4,avg_Qsoil_100-
200_PCT_4_SqDif_34.52,avg_Qsoil_100-200_PCT_5,avg_Qsoil_100-
200_PCT_5_SqDif_33.51,avg_Qsoil_100-200_PCT_6,avg_Qsoil_100-
200_PCT_6_SqDif_33.46,avg_Qsoil_100-200_PCT_7,avg_Qsoil_100-
200_PCT_7_SqDif_32.73,avg_Qsoil_100-200_PCT_8,avg_Qsoil_100-

TABLE 2-continued

Aggregated Historical Weather Data Headers

200_PCT_8_SqDif_32.63,avg_Qsoil_100-200_PCT_9,avg_Qsoil_100-
200_PCT_9_SqDif_31.97,avg_Qsoil_100-200_PCT_st175_len25,avg_Qsoil_100-
200_PCT_st175_len25_SqDif_32.88,avg_Qsoil_40-100_PCT_1,avg_Qsoil_40-
100_PCT_10,avg_Qsoil_40-100_PCT_10_SqDif_20.14,avg_Qsoil_40-
100_PCT_11,avg_Qsoil_40-100_PCT_11_SqDif_23.24,avg_Qsoil_40-
100_PCT_12,avg_Qsoil_40-100_PCT_12_SqDif_33.96,avg_Qsoil_40-
100_PCT_1_SqDif_14.14,avg_Qsoil_40-100_PCT_2,avg_Qsoil_40-
100_PCT_2_SqDif_14.47,avg_Qsoil_40-100_PCT_3,avg_Qsoil_40-
100_PCT_3_SqDif_36.96,avg_Qsoil_40-100_PCT_4,avg_Qsoil_40-
100_PCT_4_SqDif_16.66,avg_Qsoil_40-100_PCT_5,avg_Qsoil_40-
100_PCT_5_SqDif_36.32,avg_Qsoil_40-100_PCT_6,avg_Qsoil_40-
100_PCT_6_SqDif_24.56,avg_Qsoil_40-100_PCT_7,avg_Qsoil_40-
100_PCT_7_SqDif_22.99,avg_Qsoil_40-100_PCT_8,avg_Qsoil_40-
100_PCT_8_SqDif_18.42,avg_Qsoil_40-100_PCT_9,avg_Qsoil_40-
100_PCT_9_SqDif_18.03,avg_Qsoil_40-100_PCT_st0_len20,avg_Qsoil_40-
100 PCT_st0_len20_SqDif_14.42,avg_Rh_PCT_1

In another exemplary embodiment, custom periods are created by scraping and ingesting crop progress reports published by governmental agricultural statistics bureaus. These reports track the in-season progress of crops at key development and management stages; stages commonly include percent planted, percent flowered, and percent harvested. The development stages are dependent on crop physiology. Therefore, the system 100 has capabilities to find and collect updates by crop of interest. For instance, progress reports on soybeans typically include stages for blooming, setting pods, and dropping leaves. In contrast, progress reports on winter wheat include stages for tillering, jointing, and heading. The unique nomenclature for each crop's stage is therefore preserved in the system 100. In this embodiment, the start points and lengths of custom periods are determined by the dates associated with rapid progress for a given stage. Depending on the source, historical and in-season crop progress data may be scraped from PDFs and/or ingested from APIs. Established agencies like USDA-NASS may maintain robust APIs, while some foreign governments may only offer data through government reports, available electronically through PDF format.

In addition to temporal transformations, the historical weather data aggregator and processor 130 combines weather data in agronomic formulae. These formulae may use known biological thresholds and relationships with weather to create derived indices. Among others, these indices may include growing degree days, disease risk, and freeze damage. These indices may be tailored to the physiology of each crop modeled.

Importantly, the non-linearity of biological responses is also captured through the transformation of weather variables into values that represent the magnitude of departure from ideal growing conditions. In a regression model, a simple positive coefficient of an untransformed precipitation value assumes an unqualified beneficial relationship: the greater the precipitation, the higher the yield. In reality, this relationship is non-linear and the model would fail to account for the detrimental impact flooding has on crop yields. Mathematical transformations on the difference of the actual and ideal precipitation levels serve to approximate non-linear biological responses like water uptake, where too little and too much of a yield-determining factor have significant impacts.

Multiple transformations may be used, but all rely on identifying the "ideal state" for a given weather variable. As an illustrative example, the ideal precipitation amount for a wheat cultivar in Kansas may not be at the historical $50^{th}$ percentile, but at the $65^{th}$ percentile. Values below this ideal point result in actual supply falling short of optimal demand, while values above this ideal point result in actual supply exceeding optimal demand. Minor differences from actual and ideal may result in slightly less carbohydrates going towards wheat kernels; major differences will result in catastrophic yield failure and plant death. A squared difference between the actual and ideal point would capture this relationship, penalizing values further from the ideal point than values closer.

The historical weather data aggregator and processor 130 handles both optimal point searches and transformations of the weather variable in question. In the optimal point search, the historical weather data aggregator and processor 130 first identifies the historical maximum and minimum values of the time series returned in the query by the historical weather data collector 124. A routine in the historical weather data aggregator and processor 130 then queries the relational database 132 for the time series of historical yield—cleansed and stored by the agricultural data processor 122—for the target model region. For every ith percentile of the weather variable's distribution, the routine calculates the Pearson correlation coefficient of historical yield with the weather variable value at the ith percentile. The percentile with the strongest positive Pearson correlation coefficient is selected and stored as the ideal point for that weather variable, crop, and region combination. For each historical observation of the weather variable considered, the routine then generates an array of transformed values based on their difference from the identified optimal points. This array is labeled with the transformation method and optimal point, then inserted in the dataframe of processed weather features that are ultimately stored in the relational database 132.

The system 100 can weight the significance of weather inputs into the system 100 depending on the productive capacity of a certain growing region, and thus the impact of weather events. Thus, for models of large-scale growing regions (i.e., US Corn Belt), weather data for each location may be weighted by its relative contribution to the total production of the modeled region. For instance, McLean County, Ill. has a five-year average corn production of 60.8 million bushels, while Adams County, Ohio has a five-year average corn production of 11.4 million bushels. Drought in Adams County, Ohio may be less detrimental to US Corn Belt production than drought occurring in McLean County, Ill. The weighting scheme of the system 100 accounts for this consideration.

Once appropriately processed, the historical weather data are stored, along with identifying regional labels, in the relational database 132.

The modeling subsystem 30 operates upon the weather and crop information in the relational database. The modeling subsystem includes a predictive model input collector 134, a predictive model generator 136, a predictive model output collector 138, a predictive model validation director 150, a predictive model ensemble director 160, a predictive model selector 152, and an in-season forecast operator 140. While the first embodiment described herein segments the functionality of the modeling subsystem 30 into seven subcomponents 134, 136, 138, 140, 150, 152, 160, in alternative embodiments this functionality may be differently partitioned, or not partitioned at all. After the data processing stage, the predictive model input collector 134 queries the database for input data for the modeling stage. Across all models, the target variable is yield, while the predictor variables include weather data.

For region/crop pairs novel to the System 100, the predictive model input collector 134 automatically initiates a query to the relational database 132 for model input data. However, input queries can also be initiated for region/crop pairs already recognized by the system 100. This second option addresses a significant challenge that yield forecasting programs with appreciable geographic scope and resolution encounter, namely identifying and replacing poor-performing models in an efficient manner. For the continental United States alone, state- and county-level forecasts can involve thousands of models. To address this issue of scale, the predictive model input collector 134 references tabulated errors for models currently in operation that exceed a predetermined threshold. The predictive model input collector 134 gathers the regional information and crop type associated with the models that recorded large misses in the most recent year, then collects model input data required for a new round of modeling.

As a complement to the automated model replacement process of the system 100, this stage also has parallel functionality for human-in-the-loop direction. If a human forecaster identifies a particular region/crop pair of interest, the forecaster may enter a command to manually include that model pair for the predictive model input collector 134 to prepare relevant input data for the predictive model generator 136.

Once the predictive model input collector 134 has queried the database for all region/crop pairs the System has flagged, the input data are passed to the predictive model generator 136, for example, in dataframe format.

The predictive model generator 136 performs robust feature selection, for example, building linear and non-linear models for each region/crop pair passed by the predictive model input collector 134. This approach allows for extensive exploration for the statistical approach and predictor variables that offer the greatest likelihood of accurately predicting yield. In the exemplary embodiment, modeling approaches may include multiple linear regression, regularized regression, principle components analysis, decision trees, and random forests, among others. Within each modeling approach, parameters specific to the approach may be modified throughout iterations of model builds in the system 100. For example, a regularized regression model may have an alpha parameter of 2 during one modeling round and an alpha parameter of 4 during another round. This iteration allows the predictive model generator 136 to consider and compare tailored parametrization for the target crop and region.

Critically, the system 100 generates and identifies robust predictor variables that a human subject matter expert would fail to create or erroneously discard. Moving beyond simple automation, the combined capabilities of the historical weather data aggregator and processor 124 and predictive model generator 136 enable machine-driven processes to supplement and exceed human decision-making in selecting predictive models. As an example, a human with extensive expertise in agronomy will understand the intricacies of crop physiology and its relationships with environmental stresses; however, despite this he/she may still reasonably fail to identify the specific optimal point for precipitation for the predominant winter wheat cultivar grown in Syria. The system 100, in contrast, has a greater likelihood of doing so and including it in a model if the relationship has sufficiently robust predictive power.

This expansive consideration of predictive features is supplemented by thorough monitoring logic that limits unrealistic models passing through to the validation stage. There are two primary monitoring gates: feature-level screening and parameter-level regulation. At the feature-screening gate, features are evaluated for their propensity to result in biologically impossible yields (either extremely high or negative). Features with greater propensity for unrealistic yields include squared-difference transformations with extreme optimal points (i.e., $5^{th}$ percentile) and non-negative data with clumping at zero values. At the feature-screening gate, the predictive model generator 136 may inspect each feature and discard those that fall outside of programmed bounds. Similarly, at the parameter-regulating gate, the system 100 has programmed bounds for acceptable parameter extremes in order to avoid passing overfit models to the validation stage. No regulation of the parameters may result in models that perform poorly in an operational setting; if a decision tree model had no upper bound on the number of splits in the tree, the features would overfit to the data and the model would be of poor quality. The system incorporates hard-coded bounds for data transform variables (i.e., squared-difference variables) to avoid unrealistic scenarios, for example, a negative crop yield. For this reason, and similar to the functionality the feature-screening gate, the parameter-regulating gate imposes bounds on parameters to consider as part of acceptable model criteria.

For each parameterization for a given modeling approach, the predictive model generator 136 evaluates the relationship of yield with each variable collected by the predictive model input collector 134. Downstream modeling processes may incorporate linear and/or non-linear techniques. In one exemplary embodiment, this relationship between a given weather variable and yield is measured through the Pearson correlation coefficient. In this exemplary embodiment, the predictive model generator 136 may then enter automated incremental feature selection based on linear regression principles. For example, the variables may be divided into two sets, kept A and possible B. Kept variables may be variables to continue using in the training of the model. Possible variables are variables to evaluate as possible additions to the model. The kept variable category is size m while the possible variable category is size p–m where p is the total number of variables collected by the predictive model input collector 134. To start the building process, the top variables T are found as determined by the strength of the relationship with yield. The size of T is n where n is tuned by the user and determines the size of the set final models M to be built. The modeling process follows:

A) For i in {1,2,3, ... n}
    1) $t_i$ is moved from possible to kept
    2) For j in {1,2,3, ... r} where r is the number of variables in each final model and is tuned by the user.
        a. A model $N_0$ is built using the variables in kept
        b. The residuals of $N_0$ are found.
        c. Strength of relationship is found between the residuals and each of the possible variables. The possible variables are ordered based on strength of relationship $\{b_1, b_2, b_3, \ldots b_{p-m}\}$
        d. For j in {1,2,3, ... s} where s ≤ p − m and n is tuned by the user
            i. $b_j$ is moved to kept and a model $N_j$ is built using variables in kept.
            ii. The error of $N_j$ is found and stored.
            iii. $b_j$ is moved from kept to back to possible
        e. The model $N_j$ with the lowest error is found and $b_j$ is moved from possible to kept = $\{a_1, a_2, a_3, \ldots a_j\}$
    3) The final model $M_i$ is built using the variables in kept
    4) All variables in kept are moved to possible
B) The models $M_1, M_2, \ldots M_n$ are compared based on error and the top model is kept.

The error metric used to compare models is weighted average of residual error and cross validation error including leave-one-out cross-validation (LOOCV).

Once the model is built, the information of the model is loaded into, for example, computer random access memory ("RAM") or another temporary storage medium accessible by the predictive model collector 138. After model iteration has concluded, the predictive model output collector 138 identifies the models with the lowest errors and transfers their model information into a serialized file format. The serialized files allow efficient machine-reading and require low storage space. This preserves the region/crop pair modeled, the modeling approach used, model parameters, the features selected, the coefficients associated with each feature, and the in-sample and out-of-sample error. For any given region/crop pair, the predictive model generator 136 may iterate through multiple model builds, for example, hundreds of model builds.

The predictive model output collector 138 then transfers these files into the predictive model validation director 150. A threshold for model selection may be customized. In the exemplary embodiment, all models in the top decile of the modeling round are selected to continue to the validation stage. In alternative embodiments, the threshold for selection may be adjusted to be more or less inclusive based on crop type, model resolution, and time series of historical yield data.

Like other elements of the system 100, the predictive model generator 136 may optionally involve parallel functionality for custom requests by humans. Factors such as number of iterations and model parameters may be specified by a human forecaster.

Once the automated building of predictive models is complete, the predictive model validation director 150 initiates backtesting processes for each model identified as a top candidate. In the backtest processes, a historical simulation replicates past growing seasons in order to test the in-season performance of each model.

In the current embodiment, the historical simulation process starts by loading the historical weather data from the relational database 132 into RAM. For each model, the variables used are loaded and the historical weather data is subsetted. If a variable occurs after the forecast date (e.g., the forecast date is May 1, 2012 and the variable is August rainfall), Monte Carlo simulation is used to estimate values for the unrealized variable. The model then utilizes weather values to give a forecasted yield estimation for the given date. The estimated yield is stored along with the model identifier and date in RAM. This is repeated for each model and for each date given by the frequency and the number of growing seasons.

For each date in the simulation, the predictive model validation director 150 records the difference between a model's predicted yield and the actual yield. This in-season simulation environment identifies models that may have low error by the harvest period but produce erratic, unstable forecasts earlier in the season. The ultimate success of a model is determined by how early, how accurately, and how consistently a model predicts yield over time. In one exemplary embodiment, error metrics include average absolute error and root-mean square error over the simulation period.

Ensembling has been a useful method in predictive modeling, employed by various fields ranging from meteorology to finance. At its core use, ensembling helps offset and weaken biases implicit in any individual model by combining the output of several distinct models into one synthesized output. In certain cases, the ensemble approach may capture relevant information more extensively and process its implications more accurately than any standalone model. In light of this possibility, in one embodiment of the system 100, the predictive model ensemble director 160 takes the output of each model handled by the predictive model validation director 150 and combines it with output of other candidate models covering the same region/crop pair.

This ensembling step entails an extensive search for unique ensemble member combinations. The predictive model ensemble director 160 iterates through a list of unique combination and finds all possible unique combinations of models for up to five-member ensembles. Given the size of candidate models considered by the System, the predictive model ensemble director 160 may automatically parallelize the combination step, breaking the task into subtasks and sending each subtask to a different processing unit (also known as a "core") in the remote environment. In very rare instances an ensemble with more than five members may result in more accurate forecasts. However, exhausting all possible combinations with no predetermined cap on ensemble size would require an unreasonably large runtime.

The size of the ensembling job is dictated by the number of candidate models and the number of ensemble methods employed. The system 100 may have default settings for both attributes. However, both the number of candidate models and the number of ensemble methods employed may be customized for any given validation round by a human forecaster.

The predictive model ensemble director 160 returns the ensemble error for each ensemble combination tested. In the exemplary embodiment, for the top one percentile of ensembles, the error metrics are stored in a validation dataframe with identifying information, including model members and ensemble method used. A human forecaster may optionally alter the threshold (i.e., top percentile) for ensemble validation storage.

The predictive model selector 152 acts as the interface between the validation environment and the operational environment. After the validation round has concluded, the predictive model selector 152 collects the error output from individual models and ensembles. With comprehensive error output data available for manipulation, the predictive model selector 152 may reference ranking criteria to identify the model or ensemble to operationalize. In one exemplary embodiment, the criteria are average absolute error over the last ten growing seasons (final accuracy), the average in-season date when the model first achieves error below a predetermined threshold (precociousness), and the fluctuation in error observed in consecutive forecast updates (stability). The predictive model selector 152 may rank all candidate models and ensembles according to the criteria, using highly-optimized data structure sorting logic. In this ranking approach, only critical attributes are pulled from a larger validation dataframe and stored in processing-efficient ephemeral data structures. The critical attribute of interest, which in one exemplary embodiment may be average absolute error, is then sorted in ascending order. The top-ranking model or ensemble may then be selected for operational use.

Weighting for criteria can be altered based on the intended end use of the forecast. Food security policymakers may favor precociousness over all other factors—i.e., is a severe regional food shortage more likely, regardless of whether final accuracy is 2% or 10% off actual end-of-season yields. For supply chain management or farm operators, knowledge of the general direction of expected yields is not enough—these users may need to know with more precision expected yields before they arrange shipments with alternate exporters or rotate fields from one crop to another for the next season. Given the intended end use, the system 100 may utilize human-in-the-loop (HITL) functionality for a human forecast to manually parameterize weighting criteria and "earmark" models for specific end users.

Once the final selection has been identified, the predictive model selector 152 may transition the corresponding serialized model information with model type, features, and coefficients associated with features into the operational environment. In the case of ensembles, the predictive model selector 152 may transition the serialized model information for all member models in the ensemble of interest.

Figure 4:
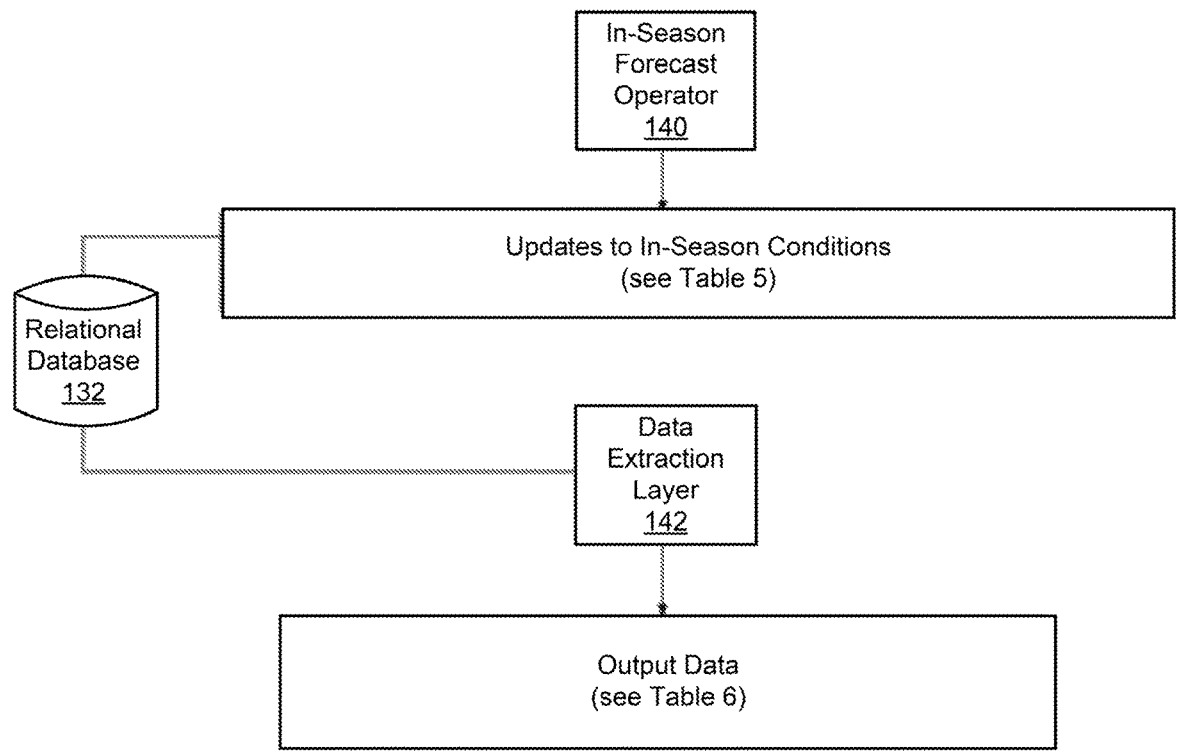
FIG. 4 is a schematic diagram of an exemplary embodiment of the in-season forecast operator and data extraction sub-component of FIG. 1B.

In an operational environment, a job coordinator is necessary to determine which crops and regions of the system 100 are currently "in-season," retrieve weather events that occurred since the forecast was last run, update the model's current season input data, initiate forecasting runs, database forecast output, and monitor output and runtime processes for errors. The in-season forecast operator 140, illustrated in FIG. 4, fulfills this role, combining oversight of in-season data processing, additional statistical modeling, runtime schedules, and data output.

Forecasts are updated for each region/crop pair throughout their respective growing season. The in-season forecast operator 140, illustrated in FIG. 4, facilitates timely updates to in-season conditions by retrieving weather data, which is stored either remotely, in servers or sources electronically connected to the in-season weather data collector 126, or locally, such as from the applicant's proprietary weather database in the exemplary embodiment. An example of updates to in-season conditions is shown in Table 5:

TABLE 5

Updates to In-season Conditions crop,state,ag_district,county,fips,mkt_yr,model_st,fcst_yield,yield_trend,area,fcst_prod,prod_trend,
yield_lo_90,yield_lo_75,yield_hi_75,yield_hi_90,prod_lo_90,prod_lo_75,prod_hi_75,prod_hi_90,
date,model_num,trend_flag,
corn,IL,20,DeKalb,17037,2017,11/1/1979,199.0706569,191.0417255,0.107184962,21.33738072,
21.12537095,182.2779849,187.348529,210.7798182,215.8237526,19.53745881,20.08094489,22.59242672,
23.13306065,9/25/2017,0,0,0
corn,IL,20,DuPage,17043,2017,11/1/1979,154.8965962,151.6645223,0.008498349,1.316365283,
0.710208407,137.0311761,142.3244285,167.4583778,173.0312903,1.164538714,1.209522618,
1.423119683,1.470480236,9/25/2017,0,0,0
corn,IL,20,Grundy,17063,2017,11/1/1979,177.7624041,181.589603,0.108686337,19.32034456,
20.64965658,155.6660711,162.1948417,192.7786863,199.8760885,16.91877506,17.62836323,20.95240927,
21.72379992,9/25/2017,10,0,10
corn,IL,20,Kane,17089,2017,11/1/1979,184.0240789,182.8813203,0.082241002,15.1343246,15.1893608,
165.0607438,170.9447688,197.0402893,202.8329764,13.57476092,14.05866903,16.20479078,
16.68118717,9/25/2017,17,0,17

The logic and processes of the in-season weather data collector 126 are built on the same processes that underpin the corollary historical weather data collector 124, as illustrated in FIG. 2.

Following the retrieval of weather data to-date by the in-season weather data collector 126, the in-season weather data aggregator and processor 128 transforms and aggregates new data to generate the same variables that models encounter in the predictive model generator 136 and predictive model validation director 150 stages. The logic and processes of the in-season weather data aggregator and processor 128 are built on the same processes that underpin the corollary historical weather data aggregator and processor 130, as illustrated in FIG. 2.

The data extraction layer 142 queries and returns the output of the in-season forecast operator 140 from a relational database, hosted locally or remotely. In one exemplary embodiment, the outputted data is stored in a PostgreSQL database hosted through a cloud-based hosting service. The data is accessed through applications servers using queries identifying a growing region and crop of interest. Table 6 shows an example of output data:

TABLE 6

Output Data

```
"countyYieldData": [
    {
        "crop": "corn",
        "state": "IL",
        "agDistrict": 20,
        "county": "DeKalb",
        "fips": 17037,
        "marketingYearStart": 2017,
        "model Start": "1979-11-01",
        "forecastYieldBpa": 205.47355441832235,
        "yieldTrendBpa": 191.0417255227928,
        "areaMa": 0.1071849616361,
        "forecastProductionMbu": 22.02367504756099,
        "productionTrendMbu": 21.125537095230864,
        "yieldLowbound90Bpa": 189.1261063839511,
        "yieldLowbound75Bpa": 194.00601464736627,
        "yieldHighbound75Bpa": 217.11946530548386,
        "yieldHighbound90Bpa": 221.8281670529553,
        "productionLowbound90Mbu": 20.27147445714877,
        "productionLowbound75Mbu": 20.79452723715061,
        "productionHighbound75Mbu": 23.271941559218835,
        "productionHighbound90Mbu": 23.776643575377395,
        "updateDate": 1511740800000,
        "modelNumber": 0,
        "id": 32205
    },
```

Access to the data can be provided in a variety of ways. One exemplary embodiment allows a user to hit a RESTful (representational state transfer) API endpoint to retrieve the data through JavaScript based database queries.

Data may be returned through these endpoints in a variety of formats. One exemplary embodiment returns data such as growing region name, crop name, area planted, current yield forecast, current implied production (acreage estimate multiplied by yield forecast), a two-month time series of most recent yield forecasts made, and historical yield trend for the growing region in a JSON (JavaScript object notation) format.

The system 100 may include a graphical user interface 165 (GUI) and/or may include the ability to output data to the GUI 165, which allows visualization of the data over a map, color-coded growing regions by forecast percentage above or below historical trend, and user-friendly toggling between crops forecasts and geographic scales of forecasts.

If the GUI 165 is hosted remotely, the user would access the GUI 165 through a communications device connected to the remote host. In one exemplary embodiment, the data are displayed to a user through an in-browser web application, built in HTML, CSS, and JavaScript. The map displayed uses the MapBox map interface. The user may select the crop of interest and navigate to different growing regions of interest. For forecasts of the same growing region at different resolutions, the user may toggle between national and sub-national tabs. On the map interface, the user has the ability to view forecasts, historical statistics, and relevant in-season data by selecting a growing region on the map.

There are a number of points in the system 100 described herein that may incorporate machine learning techniques to further optimize data processing, model generation, and in-season operation. These techniques may include, but are not limited to, predicting in-season forecast volatility by type of feature variables in the underlying model and adjusting scope of parameters tested in model generation iterations (i.e., random forest splits) based on past metrics of similar regions and crops modeled. While these techniques have the potential to enhance the functionality of the system 100, these techniques may not be essential to the system 100.

Figure 6:
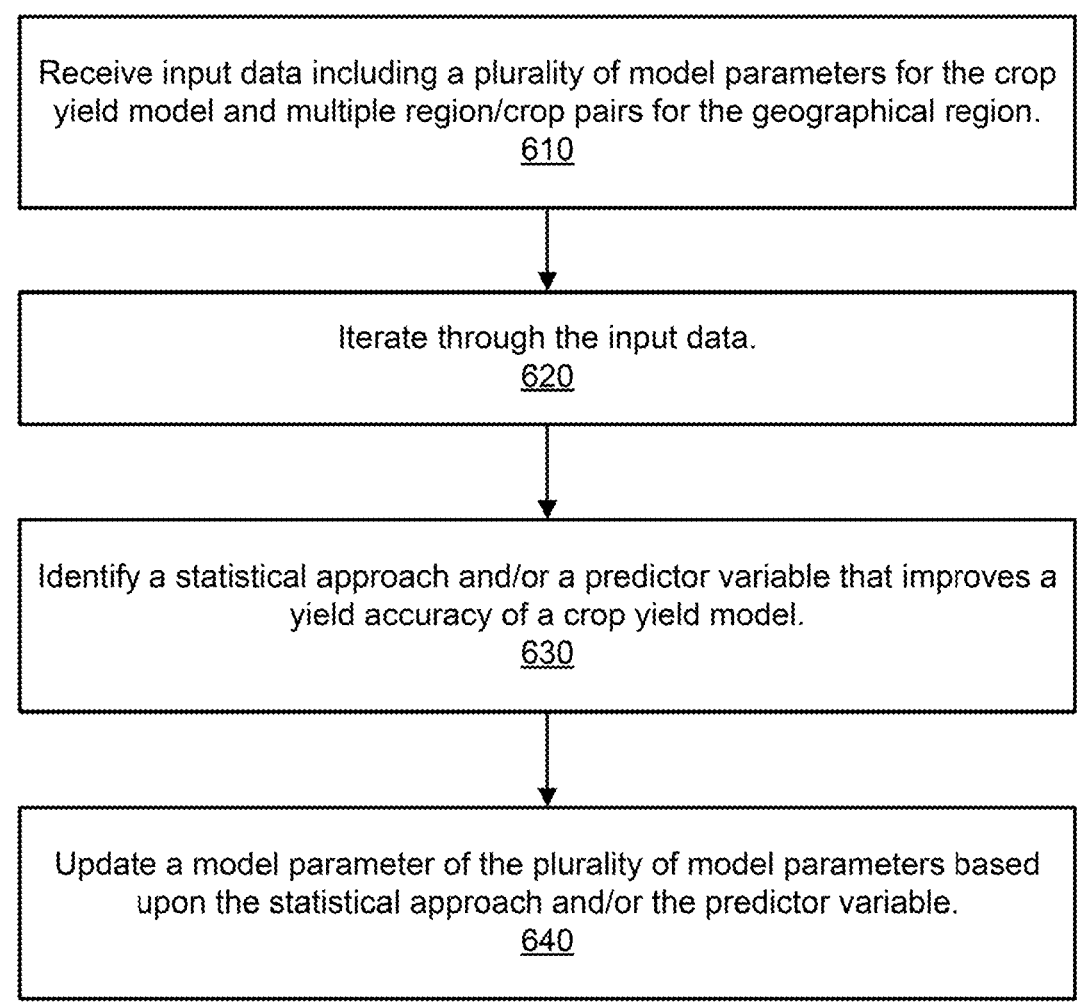
FIG. 6 is a flowchart of an exemplary method implemented by a predictive model generator.

FIG. 6 is a flowchart of an exemplary method implemented by a predictive model generator 136. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Input data including a plurality of model parameters for the crop yield model and multiple region/crop pairs for the geographical region is received, as shown by block 610. The input data is iterated through, as shown by block 620. A statistical approach and/or a predictor variable that improves a yield accuracy of the crop yield model is identified, as shown by block 630. A model parameter of the plurality of model parameters based upon the statistical approach and/or the predictor variable is updated, as shown by block 640.

Figure 5:
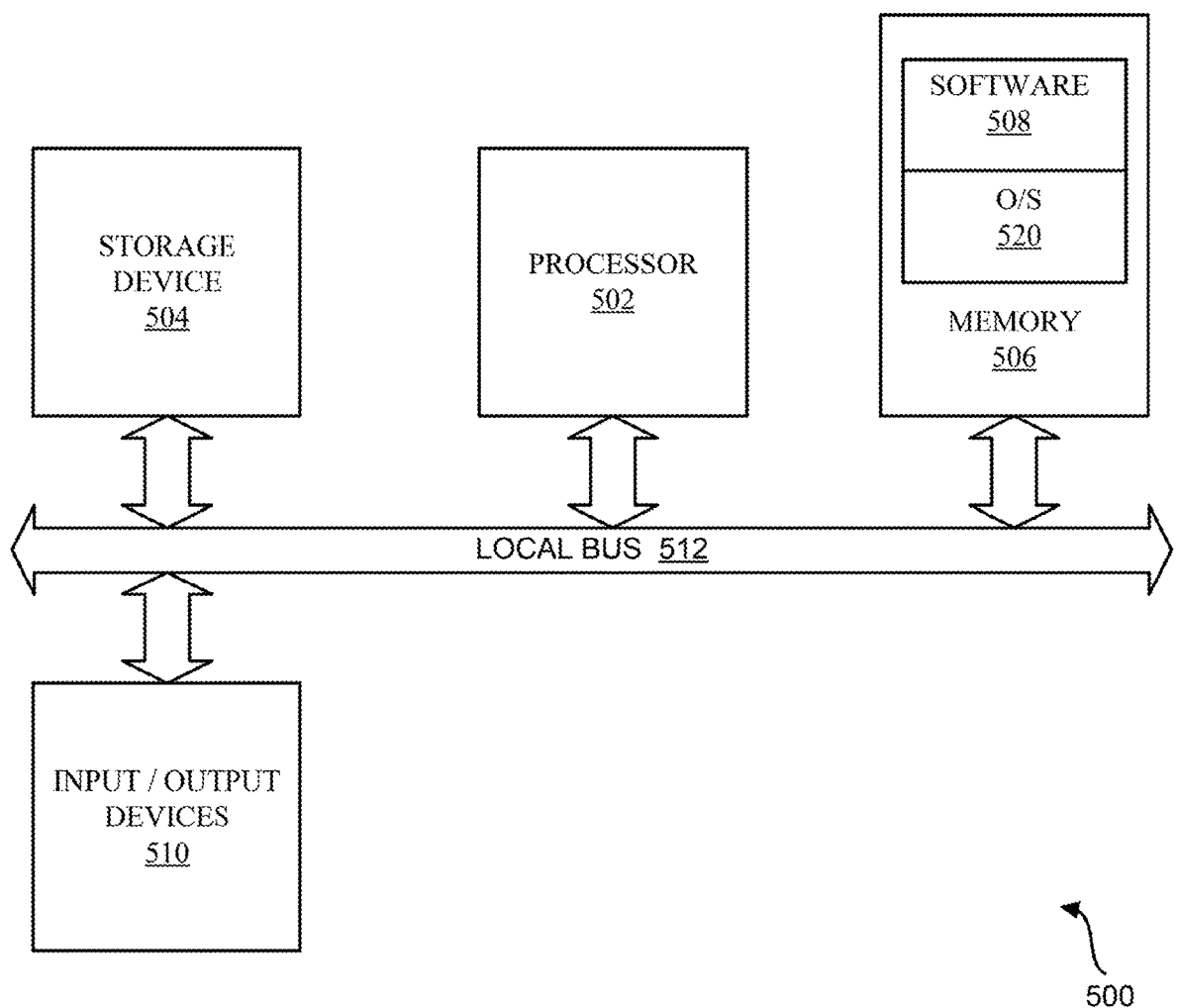
FIG. 5 is a schematic diagram illustrating an example of a system for executing functionality of the present invention.

As previously mentioned, the present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The first embodiment differs from merely automating a large number of human created models. For example, the system 100 does not merely produce models based on all possible combinations of input data. Instead the system 100 incorporates hard-coded bounds data transform variables (square dev variables) on combinations to avoid unrealistic scenarios, for example, a negative crop yield. Previously, humans would develop models for regions (e.g., states) broken down into sub-regions (e.g., counties), and selectively reduce system parameters to eliminate marginal yield scenarios. However, while human-driven models incorporated the experience of the human modeler based on crop and weather knowledge to narrow down the models to the most "useful" (likely) scenarios, it has been shown that this human pre-selection process actually eliminates a significant number of models produced by the machine-driven system using the hard-coded bounds that would have been useful in predicting crop yields in both trend years and anomalous years.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A device configured to build a target crop yield model for a predefined commodity produced in a predefined geographical region, comprising:
   a processor and a memory storing non-transitory instructions that when executed by the processor cause the processor cause the processor to perform the steps of:
      receiving input data comprising a plurality of model parameters for a target crop yield model for a predefined crop produced in a predefined geographic region, wherein the target crop yield model is configured to predict a yield of the predefined crop in the predefined geographic region before the yield is realized in terms of a set of predictor variables and a statistical framework;
      receiving multiple pairs of region/crop data for the predefined geographical region;
      building linear and non-linear models for each of the region/crop pairs,
      for each pair of region/crop data received, iterating through multiple builds for the target crop yield model utilizing multiple modeling approaches selected from the group consisting of multiple linear regression, regularized regression, principle components analysis, decision trees, and random forests, and
      wherein, within each modeling approach, parameters specific to that modeling approach are modified throughout iterations of the multiple builds, and wherein a predictive model generator considers and compares tailored parametrization for the target crop and region;

identifying, based on the multiple builds, a statistical approach and/or a predictor variable that improves a forecast yield accuracy of the crop yield model; and updating model parameters of the plurality of model parameters based upon the identified statistical approach and/or the predictor variable.

2. The device of claim 1, wherein the multiple pairs of region/crop data comprises agronomic data and weather data.

3. The device of claim 2, wherein the weather and agronomic data is automatically selected and comprises data otherwise excluded based on biases of a human operator and/or comprises data otherwise not omitted as irrelevant and/or as an insufficiently powerful predictor by a person having ordinary skill in the art.

4. The device of claim 1, wherein the input data comprises historical agricultural data and weather data for the geographical region, and/or an in-season forecast parameter.

5. The device of claim 1, wherein the processor is further configured to perform the step of:
forming an acceptable model criteria, further comprising the steps of:
setting an upper bound for the model parameter; and
setting a lower bound for the model parameter.

6. The device of claim 1, wherein the processor is further configured to perform the steps of:
determining if the crop yield model is unrealistic; and
if the crop yield model is unrealistic filtering the crop yield model.

7. The device of claim 6, wherein determining if a model is unrealistic further comprises feature-level screening and parameter-level regulation.

8. The device of claim 1, wherein the model includes at least one of the group consisting of multiple linear regression, regularized regression, principle components analysis, decision trees, adaptive boosting and bagging, and random forests.

9. The device of claim 1, wherein the memory stores further non-transitory instructions that when executed by the processor cause the processor to perform the steps of:
building linear and non-linear models for each of the region/crop pairs,
wherein iterating through the multiple builds for the target crop yield model utilizes multiple modeling approaches selected from the group consisting of multiple linear regression, regularized regression, principle components analysis, decision trees, and random forests, and
wherein, within each modeling approach, parameters specific to that modeling approach are modified throughout iterations of the multiple builds, and
wherein a predictive model generator considers and compares tailored parametrization for the target crop and region.

10. The device of claim 1, further comprising:
automatically retrieving, without human direction, agricultural statistics as they become available for crop/region pairs recognized as forecast targets.

11. The device of claim 10, wherein the crop/region pairs recognized as forecast targets are pre-identified based on point in time and/or command line calls.

12. The device of claim 1, wherein historical weather data is hosted utilizing a weather database containing rationalized, hourly weather data gridded globally at a particular resolution dating back to a particular year.

13. The device of claim 1, wherein in response to a human user initiating a query for a region not recognized, the processor finds all grid IDs associated with the region of interest, queries the weather database for historical weather data associated with those grid IDs, and returns a time series of daily values for a comprehensive suite of weather variables for each grid ID.

14. The device of claim 1, wherein the daily values are stored in a comma-separated format (CSV) or another dataframe structure.

15. The device of claim 1 further incorporating hard-coded bounds for data transform variables to avoid unrealistic scenarios.

16. The device of claim 1, wherein the memory stores further non-transitory instructions that when executed by the processor cause the processor to perform the step of selecting a top-ranking model for operational use.

17. A system for forecasting crop yield, comprising:
a relational database;
a preprocessor configured to periodically query for and receive pre-identified agronomic data and weather data and to transform the agronomic data and weather data for storage in the relational database;
a modeling subsystem configured to access the agricultural data and weather data from the relational database and generate, validate, select, and execute a plurality of crop yield forecasting models for storage in the relational database; and
a user interface configured to access an output of the plurality of crop yield models in the relational database and display selected forecasts for end users,
wherein the modeling subsystem further comprises a predictive model generator configured to:
receive input data comprising a plurality of model parameters for a target crop yield model for a predefined crop produced in a predefined geographic region, wherein the target crop yield model is configured to predict a yield of the predefined crop in the predefined geographic region before the yield is realized in terms of a set of predictor variables and a statistical framework;
receive multiple pairs of region/crop data for the predefined geographical region;
build linear and non-linear models for each of the region/crop pairs;
for each pair of region/crop data received, iterate through multiple builds for the target crop yield model utilizing multiple modeling approaches selected from the group consisting of multiple linear regression, regularized regression, principle components analysis, decision trees, and random forests, and
wherein, within each modeling approach, parameters specific to that modeling approach are modified throughout iterations of the multiple builds, and
wherein a predictive model generator considers and compares tailored parametrization for the target crop and region;
identifying, based on the multiple builds, a statistical approach and/or a predictor variable that improves a forecast yield accuracy of the crop yield model; and
updating model parameters of the plurality of model parameters based upon the identified statistical approach and/or the predictor variable.

18. The system of claim 17, wherein the weather and agronomic data is automatically selected and comprises data otherwise excluded based on biases of a human operator and/or comprises data otherwise not omitted as irrelevant and/or as an insufficiently powerful predictor by a person having ordinary skill in the art.

19. The system of claim 17, wherein the modeling subsystem further comprises a predictive model input collector configured to collect the input data, and wherein, the predictive model input collector queries the database for the input data.

20. The system of claim 19, wherein the predictive model generator is configured to perform robust feature selection comprising building linear and/or nonlinear models for each region/crop pair of the input data.

21. The system of claim 19, wherein for a parameterization for a modeling approach, the predictive model generator is configured to evaluate a relationship of yield with each variable of a plurality of variables of the input data.

22. The system of claim 19, wherein the predictive model generator is configured to load the crop yield model into a memory.

23. The system of claim 22, wherein the modeling subsystem further comprises predictive model output collector configured to access the memory to identify a crop yield model with the fewest errors and transfers information from the crop yield model information into a serialized file format.

24. The system of claim 19, wherein a modeling approach includes one or more selected from the group consisting of multiple linear regression, regularized regression, principle components analysis, decision trees, adaptive boosting and bagging, and random forests.

* * * * *